United States Patent
Marron et al.

(10) Patent No.: US 7,057,742 B2
(45) Date of Patent: Jun. 6, 2006

(54) FREQUENCY-SCANNING INTERFEROMETER WITH NON-SPECULAR REFERENCE SURFACE

(75) Inventors: Joseph C. Marron, Ann Arbor, MI (US); Dean Faklis, Bloomfield, NY (US)

(73) Assignee: Lightgage, Inc., Bloomfield, NY (US)

( * ) Notice: Subject to any disclaimer, the term of this patent is extended or adjusted under 35 U.S.C. 154(b) by 180 days.

(21) Appl. No.: 10/610,235

(22) Filed: Jun. 30, 2003

(65) Prior Publication Data

US 2004/0075844 A1 Apr. 22, 2004

Related U.S. Application Data

(60) Provisional application No. 60/392,810, filed on Jul. 1, 2002.

(51) Int. Cl.
*G01B 11/02* (2006.01)
*G01B 9/02* (2006.01)

(52) U.S. Cl. ............ 356/512; 356/484; 356/485; 356/497; 356/504; 356/511; 356/513

(58) Field of Classification Search .......... 356/484, 356/485, 497, 504, 511, 512, 513
See application file for complete search history.

(56) References Cited

U.S. PATENT DOCUMENTS

| 4,725,144 A | * | 2/1988 | Nelson et al. ........ 356/513 |
| 4,832,489 A | | 5/1989 | Wyant et al. ........ 356/359 |
| 5,319,668 A | | 6/1994 | Luecke ............ 372/107 |
| 5,467,184 A | | 11/1995 | Tenjimbayashi |
| 5,546,187 A | * | 8/1996 | Pepper et al. ........ 356/487 |
| 5,627,363 A | | 5/1997 | Paxman et al. ........ 350/208.1 |
| 5,666,195 A | | 9/1997 | Schultz et al. |
| 5,777,742 A | * | 7/1998 | Marron ............ 356/458 |
| 5,802,085 A | | 9/1998 | Lefevre et al. ........ 372/20 |
| 5,867,512 A | | 2/1999 | Sacher ............ 372/20 |
| 5,880,841 A | | 3/1999 | Marron et al. ........ 356/360 |
| 5,907,404 A | | 5/1999 | Marron et al. ........ 356/360 |
| 5,909,282 A | * | 6/1999 | Kulawiec ............ 356/504 |
| 5,926,277 A | | 7/1999 | Marron et al. ........ 356/360 |
| 6,015,969 A | * | 1/2000 | Nathel et al. ........ 250/227.27 |
| 6,018,535 A | | 1/2000 | Maeda ............ 372/20 |
| 6,026,100 A | | 2/2000 | Maeda ............ 372/20 |
| 6,195,168 B1 | * | 2/2001 | De Lega et al. ........ 356/497 |
| 6,359,692 B1 | * | 3/2002 | Groot ............ 356/512 |
| 6,424,407 B1 | * | 7/2002 | Kinrot et al. ........ 356/28 |
| 6,656,528 B1 | * | 12/2003 | Ouellet et al. ........ 427/307 |
| 2002/0109851 A1 | | 8/2002 | Deck ............ 356/512 |

OTHER PUBLICATIONS

"Multiple–wavelength Interferometry With Tunable Source", R.G. Pilston and G.N. Steinberg, Applied Optics, vol. 8, No. 3, Mar. 1969, pp. 552–556.
"Two–wavelength Interferometry", D. Malacara, editor, *Optical Shop Testing*, New York, Wiley, 1978, pp. 397–402.

(Continued)

*Primary Examiner*—Gregory J. Toatley, Jr.
*Assistant Examiner*—Khaled Brown
(74) *Attorney, Agent, or Firm*—Thomas B. Ryan; Brian B. Shaw, Esq.; Harter, Secrest & Emery LLP (57) ABSTRACT

A frequency-scanning interferometer is modified to include a diffuse reference surface. An illuminating system produces an expanding measuring beam, portions of which reflect from a test object surface and the diffuse reference surface on converging paths to an imaging system. Interference patterns between overlapping images of the object and reference surfaces are generated at a plurality of frequencies for measuring the object surface with respect to the reference surface.

44 Claims, 4 Drawing Sheets

OTHER PUBLICATIONS

"Multiple–wavelength Phase–shifting Interferometry", Y. Cheng and J,C. Wyant, Applied Optics, vol. 24, No. 6, Mar. 15, 1985, pp. 804–806.

"Distance measurement by the wavelength shift of laser diode light", H. Kikuta, K. Iwata, and R. Nagata, Applied Optics, vol. 25, No. 17, Sep. 1, 1986, pp. 2976–2980.

"Interferometer for measuring displacement and distance", T. Kubota, M. Nara, and T. Yoshino, Optics Letters, vol. 12, No. 5, May 1987, pp. 310–312.

"Three–color laser–diode interferometer", P. de Groot, Applied Optics, vol. 30, No. 25, Sep. 1, 1991, pp. 3612–3616.

"Wavelength–shift Interferometry for distance measurements using the Fourier transform technique for fringe analysis", M. Suematsu and M. Takeda, Applied Optics, vol. 30, No. 28, Oct. 1, 1991, pp. 4046–4055.

"Three–dimensional lensless imaging using laser frequency diversity", J.C. Marron and K.S. Schroeder, Applied Optics, vol. 31, No. 2, Jan. 10, 1992, pp. 255–262.

"Holographic laser radar", J.C. Marron and K.S. Schroeder, Optics Letters, vol. 18, No. 5, Mar. 1, 1993, pp. 385–387.

"Use of a opacity constraint in three–dimensional imaging", R. G. Paxman, J.H. Seldin, J.R. Fienup, and J.C, Marron, in proceedings of the SPIE Coference on Inverse Optics III, Orlando, Florida, Apr. 1994.

"Applications of Tunable Lasers to Laser Radar and 3D Imaging", L.G. Shirley and G.R. Hallerman, Technical Report 1025, Lincoln Laboratory, MIT, Lexington, Massachusetts, Feb. 26, 1996.

"Wavelength scanning profilometry for real–time surface shape measurement", S. Kuwamura and I. Yamaguchi, Applied Optics. vol. 36, No. 19, Jul. 1, 1997, pp. 4473–4482.

"Three–dimensional imaging using a tunable laser source", J.C. Marron and K.W. Gleichman, Optical Engineering 39(1) 47–51, Jan. 2000, pp. 47–51.

"Spectrally narrow pulsed dye laser without beam expander", M.G. Littman and H.J. Metcalf, Applied Optics. vol. 17, No. 14, Jul. 15, 1978, pp. 2224–2227.

"A simple extended–cavity diode laser", A.S. Arnold, J.S. Wilson, and M.G. Boshier, Review of Scientific Instruments, vol. 69, No. 3, Mar. 1998, pp. 1236–1239.

"External–cavity diode laser using a grazing–incidence diffraction grating", K.C. Harvey and C.J. Myatt, Optics Letters, vol. 16, No. 12, Jun. 15, 1991, pp. 910–912.

"Novel geometry for single–mode scanning of tunable lasers", K Liu and M.G. Littman, Optics Letters, vol. 6, No. 3, Mar. 1981, pp. 117–118.

"External–cavity Frequency–stabilization of visible and infrared semiconductor lasers for high resolution spectroscopy", M.G. Boshier, D. Berkeland, E.A. Hinds, and V. Sandoghar, Optics Communications 85, Sep. 15, 1991, pp. 355–359.

"Widely Tunable External Cavity Diode Lasers", T. Day, M. Brownell, and I–Fan Wu, New Focus, Inc., 1275 Reamwood Avenue, Sunnydale, California.

"Littrow configuration tunable external cavity diode laser with fixed direction output beam", C.J. Hawthorn, K.P. Weber and R.E. Scholten, Review of Scientific Instruments, vol. 72, No. 12, Dec. 2001, pp. 4477–4479.

"Fizeau Interferometer", D. Malarcara, editor, *Optical Shop Testing*, New York, Wiley, 1978, pp. 19–24.

"Burch's Interferometer Employing Two Matched Scatter Plates", D. Malarcara, editor, *Optical Shop Testing*, New York, Wiley, 1978, pp. 82–84.

"Holographic contouring by using tunable lasers", N. George and W. Li, Optics Letters, vol. 19, No. 22, Nov. 15, 1994, pp. 1879–1881.

"Use of a multimode short–external–cavity laser diode for absolute–distance intererometry", P. de Groot, Applied Optics, vol. 32, No. 22, Aug. 1, 1993, pp. 4193–4198.

"Three–dimensional sensing of rough surfaces by coherence radar", T. Dresel, G, Hausler, and H. Venzke, Applied Optics, vol. 31, No. 7, Mar. 1, 1992, pp. 919–925.

Littrow–Laser Web site sacher.de/littrow.htm, Apr. 7, 2002.

"Tunable Diode Lasers—Stand up to Research and Commercial Applications", B. Shine, Laser Product Line Manager, New Focus, Inc., originally published in Photonics Spectra, Jan. 1992, pp. 102.

"Scatter Fringes of Equal Thickness", J.M. Burch, Nature, vol. 17, May 16, 1953, pp. 889–890.

"Scatter–Fringe Interferometry", J.M. Burch, J. Opt. Soc. Am. 52, 1962, pp. 600.

"Some Further Aspects of Scatter–Fringe Interferometry", A.H. Shoemaker and M.V.R.K. Murty, Applied Optics, vol. 5, No. 4, Apr. 1966, pp. 603–607.

"Laser Speckle and Related Phenomena", J.C. Dainty, editor, Springer–Verlag, Berlin, 1984.

"Digital Picture Processing", A. Rosenfeld, and A.C. Kak, vol. 1,. Academic Press. New York. 1982.

U.S. Appl. No. 10/446,012 entitled Tunable Laser System Having "An Adjustable External Cavity".

U.S. Appl. No. 10/465,181 entitled "Common–path Frequency–scanning Interferometer".

U.S. Appl. No. 10/601,802 entitled "Multi–stage Data Processing For Frequency–scanning Interferometer".

U.S. Appl. No. 10/610,236 entitled "Interferometer System of Compact Configuration".

* cited by examiner

FREQUENCY-SCANNING INTERFEROMETER WITH NON-SPECULAR REFERENCE SURFACE

RELATED APPLICATIONS

This application claims the benefit of prior filed U.S. Provisional Application No. 60/392,810, filed Jul. 1, 2002, which is hereby incorporated by reference.

TECHNICAL FIELD

Frequency-scanning interferometry exploits relationships between interference and beam frequency to measure path length differences between interfering object and reference beams.

BACKGROUND

Conventional interferometers arranged for comparing object and reference surfaces using the mechanism of interference generally require illuminating and imaging systems that are matched in size to the size of the object surface. Typically, the illuminating systems collimate the object and reference beams at a common diameter encompassing the desired measurement area of the object surface. Imaging systems collect the collimated object and reference beams following respective reflections from object and reference surfaces.

Generally, the sizes of the object and reference beams are not significantly affected by their encounters with (e.g., reflections from) the object and reference surfaces. If the object and reference beams are produced by the illuminating system as expanding beams, even larger diameter imaging optics are required to collect the object and imaging beams following their encounters with the object and reference surfaces because the beams continue to expand following their encounters. The illuminating systems generally employ expensive collimating optics so that individual rays of the object and reference beams approach the object and reference surfaces at normal incidence or at least at a constant angle of incidence.

The measurements carried out by conventional interferometers compare object surfaces to reference surfaces that share the same nominal geometric form as the object surfaces. Differences between the object and reference surfaces measured as path length variations between the object and reference beams are generally attributed to errors in the object surface. Accordingly, the reference surfaces are generally made as accurately as possible. Most reference surfaces are highly polished mirrors that exhibit spectral reflection.

The unambiguous measurement interval of conventional interferometers is related to the central wavelength (frequency) of the object and reference beams. Interference patterns produced by overlapping images of the object and reference surfaces contain fringe patterns of constructive and destructive interference between the object and reference beams. A single cycle of constructive and destructive interference between adjacent fringes is the unambiguous measurement interval. Fringes produced by reflective surfaces at normal incidence in a single pass have fringe spacings representing surface height variations of the object surface equal to one-half of the central wavelength of the interfering beams. Given the usual range of optically transmissive wavelengths, this has two main effects. First, very smooth (e.g., specular) reference surfaces are required. Second, only object surfaces having limited roughness can be unambiguously measured.

Multiple wavelength interferometers can be used for expanding the unambiguous measurement interval of conventional interferometers. Broad-band interferometers, also referred to as "white light" interferometers, expand the measurement interval by measuring a succession of physical displacements between object and reference surfaces required to identify points of peak interference contrast that occur at equal optical path length differences between the object and reference surfaces. The amounts of displacement required to position each point on the object surface at an equal optical path length with a corresponding point on the reference surface are measured to map the surface topology of the object surface.

Frequency-scanning interferometers, also referred to as wavelength-scanning interferometers or multi-wavelength interferometers, derive their broader range of measurement from a plurality of interference patterns produced at a succession of different beam frequencies (or wavelengths). In contrast to conventional interferometers that compare path length differences between points within the same interference patterns and use additional interference patterns to make finer measures or to resolve ambiguities within the unambiguous measurement interval, frequency-scanning interferometers can measure points common to the plurality of interference patterns individually, based upon interferometric (e.g., intensity or phase) fluctuations of the corresponding points within the plurality of interference patterns produced at different beam frequencies.

As such, a wider range of surface roughness can be unambiguously measured by frequency-scanning interferometers. Conventional interferometers are typically limited to measuring step sizes in the direction of illumination within the fringe spacing of their interference patterns, which relate directly to the wavelength of the illumination. The measurement of such step sizes by frequency-scanning interferometers is normally independent of the nominal wavelength of illumination, depending instead on the average interval between the beam frequencies. The finer the interval, the larger the range of unambiguous measurement. Thus, frequency-scanning interferometers can provide measures of rough or diffuse object surfaces at beam frequencies that produce speckle-ridden interference patterns unintelligible to conventional interferometers.

Frequency-scanning interferometers are especially useful for measuring surface profiles (topographies) of test objects as measures of surface variations taken normal to a reference plane or surface. Recent developments of frequency-scanning interferometry include the use of components such as tunable diode lasers and CCD detector arrays. As a result, compact, accurate, and fast systems have been developed, which have the capability of performing measurements for a wide range of test surfaces.

Figure 1:
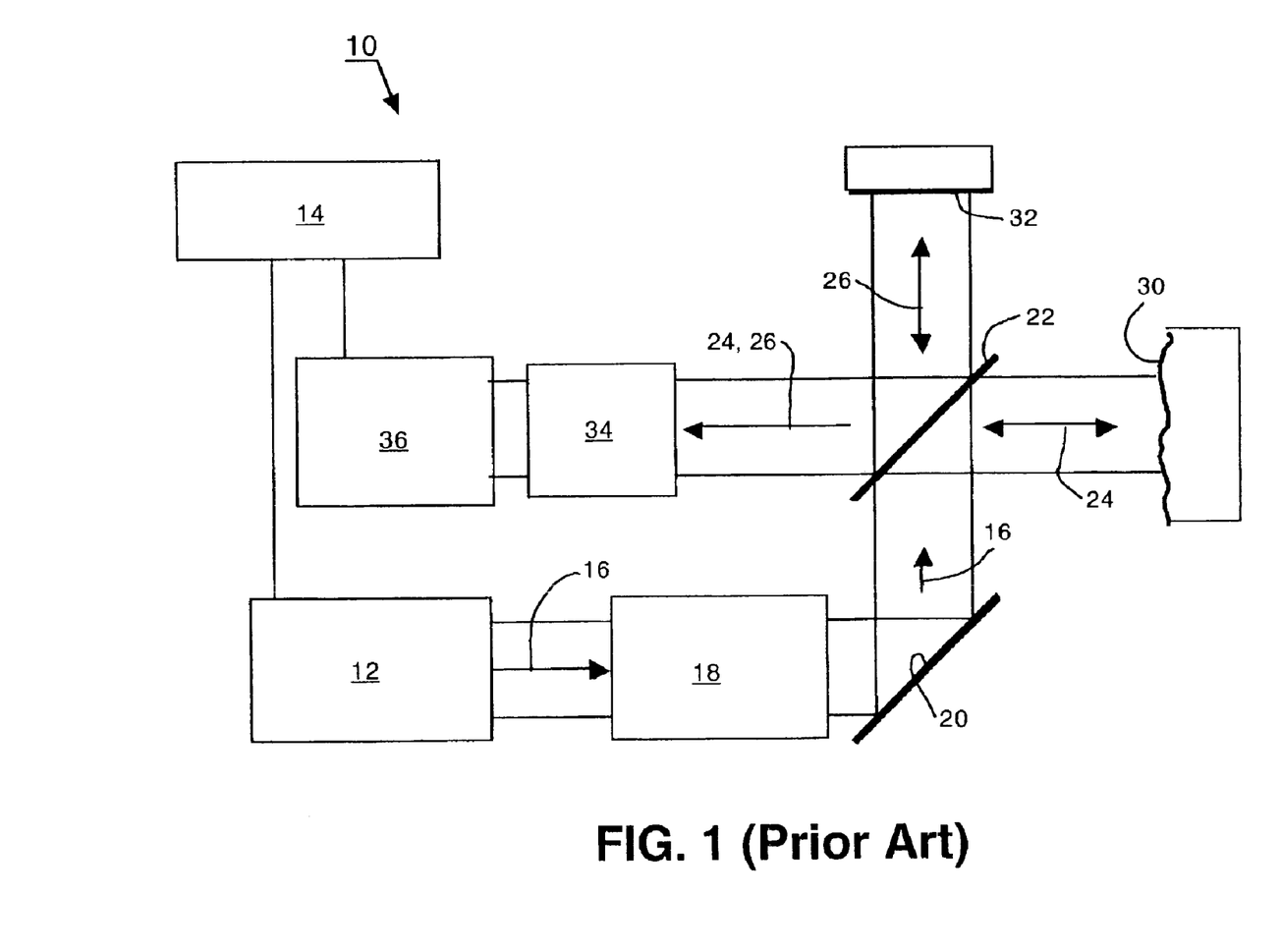
FIG. 1 is a block diagram showing an interferometer system of the prior art which can be improved by the use of the invention.

A known frequency-scanning interferometer system 10 is depicted in FIG. 1. While in the overall form of a Twyman-Green interferometer, a tunable laser 12 under the control of a computer 14 produces a measuring beam 16 that can be tuned through a range of different frequencies. An illuminating system including beam conditioning optics 18 expand and collimate the measuring beam 16. A folding mirror 20 directs the measuring beam 16 to a beamsplitter 22 that divides the measuring beam 16 into a object beam 24 and a reference beam 26. The object beam 24 retroreflects from a test object 30, and the reference beam 26 retroreflects from a reference mirror 32. The beamsplitter 22 recombines the object beam 24 and the reference beam 26, and imaging optics 34 (such as a lens or group of lenses) of an imaging system focus overlapping images of the test object 30 and the reference mirror 32 onto a detector array 36 (such as a CCD array of elements). The detector array 36 records the interferometric values of an interference pattern produced by path length variations between the object and reference beams 24 and 26. Outputs from the detector array 36 are stored and processed in the computer 14.

The elements (pixels) of the detector array 36 record local interferometric values subject to the interference between the object and reference beams 24 and 26. Each of the interferometric values is traceable to a spot on the test object 30. However, instead of comparing interferometric values between the array elements (pixels) to determine phase differences between the object and reference beams 24 and 26 throughout an interference pattern as a primary measure of surface variation, a set of additional interference patterns is recorded for a series of different beam frequencies (or wavelengths) of the measuring beam 16. The tunable laser 12 is stepped through a succession of incrementally varying beam frequencies, and the detector array 36 records the corresponding interference patterns. Data frames recording individual interference patterns numbering 16 or 32 frames are typical.

The local interferometric values vary in a sinusoidal manner with the changes in beam frequency, cycling between conditions of constructive and destructive interference. The rate of interferometric variation, e.g., the frequency of intensity variation, is a function of the path length differences between the local portions of the object and reference beams 24 and 26. Gradual changes in intensity (lower interference frequency variation) occur at small path length differences, and more rapid changes in intensity (higher interference frequency variation) occur at large path length differences.

Discrete Fourier transforms can be used within the computer 14 to identify the interference frequencies of interferometric (e.g., intensity) variation accompanying the incremental changes in the beam frequency of the measuring beam 16. The computer 14 also converts the interference frequencies of interferometric variation into measures of local path length differences between the object and reference beams 24 and 26, which can be used to construct a three-dimensional image of the test object 30 as measures of profile differences from a surface of the reference mirror 32. Since the reference mirror 32 is planar, the determined optical path differences are equivalent to deviations of the object 30 from a plane. The resulting three-dimensional topographical information can be further processed to measure important characteristics of the object 30 (e.g. flatness or parallelism), which are useful for quality control of precision manufactured parts.

Although frequency-scanning interferometers can be used to measure object surfaces having a much greater range of surface roughness than can be measured by conventional interferometers, the dimensions of the illuminating and imaging optics remain much the same. For example, the beam conditioning optics 18 are sized to expand and collimate the measuring beam 16 so that the object beam 24 and the reference beam 26 encompass similarly sized areas of the test object 30 and the reference mirror 32. The imaging optics 34 are similarly dimensioned to focus the reflected but still collimated object and reference beams 24 and 26 onto the detector array 36. Thus, the size of the illuminating and imaging systems is matched to the size of the test object 30 and reference mirror 32. The cost of such optical systems becomes prohibitively expensive for measuring large test objects and can remain considerable even for measuring small test objects. Collimating optics, especially those sized for measuring large test objects are particularly expensive and occupy considerable space, which are detrimental to making more compact interferometer systems.

SUMMARY OF INVENTION

The invention includes a discovery that the illuminating and imaging systems of a frequency-scanning interferometer can be sized independently of the size of a test object surface by fashioning the reference surface as a non-specular or diffuse surface. The reference beam is altered by an encounter with the non-specular or diffuse reference surface so that a representative portion of the reference beam can be captured by the imaging system. A representative portion of the object beam can be similarly captured by the imaging system by encountering a non-specular or diffuse surface of the test object as is typical of machined surfaces.

Illuminating optics can be made much smaller and simplified by producing an expanding beam for illuminating the object and reference surfaces. The non-specular or diffuse reference surface alters the reference beam so that a representative (i.e., generally pervasive) portion of the expanding beam propagates along a converging path to the imaging optics. Thus, the imaging optics can be reduced in size as well. Although the angles at which individual rays of the reference beam depart from the reference surface can vary widely or even randomly over the traverse area of the reference surface, the optical path lengths through the imaging system to corresponding points of focus are not affected by such angular variation. Field-dependent variations in incident angles associated with spherically diverging forms of the object and reference beams can be accommodated by well-defined calibrations (i.e., scale factors). Accordingly, path length differences between the object and reference beams continue to provide a comparison between the object and reference surfaces despite the beam alterations attendant to the non-specular or diffuse form of the object and reference surfaces.

One example of an interferometer benefiting from the invention includes an illuminating system that illuminates an object surface with an object beam and a reference surface with a reference beam. An imaging system produces overlapping images of the object surface and the reference surface for gathering interferometric data based on path length differences between the object and reference beams. A frequency regulator regulates a frequency of the object and reference beams at which interferometric data is gathered over a range of different frequencies. A processor converts variations in the interferometric data as a function of beam frequency into measures of the path length differences between the object and reference beams. In contrast to prior practices, the reference surface is substantially non-specular so that the reference beam is altered upon reflection to enhance the imaging of the reference surface.

The reference surface preferably has a nominal geometric surface form; and measured with respect to normals to the surface form, rays of the reference beam reflect from the reference surface at angles that depart from angles at which the reference beam rays are incident upon the reference surface. For example, the reference surface can be a nominally planar surface, and the interferometric data can contain information relating to differences between the object surface and the nominally planar form of the reference surface. The reference beam propagates toward the reference surface along an optical axis, and more rays of the reference beam converge toward the optical axis immediately after reflection from the reference surface than immediately before reflection from the reference surface.

The non-specular property of the reflective reference surface can also be defined as a form of dispersion, which can be structured or unstructured. For example, the non-specular or dispersion properties of the reference surface can produce a random or an ordered alteration of the reference beam. Preferably, the alteration is largely random causing the rays of the reference beam to scatter upon reflection from the reference surface. However, the alteration can include beam-shaping properties for such purposes as controlling and distributing beam contents within a prescribed form. The random component of the alteration of the reference beam can be characterized as reducing spatial coherence or as reducing anisotropic reflection.

The illuminating system can be arranged to produce non-collimated object and reference beams that expand upon approach to the object and reference surfaces. Representative (i.e., generally pervasive) portions of both the object beam and the reference beam reflect from the object and reference surfaces on converging paths toward the imaging system. The preferred imaging system has a imaging aperture area, and the object surface imaged by the imaging system has a transverse area that is larger than the imaging aperture area. In addition, the preferred illuminating system has an illuminating aperture area, and the transverse area of the object surface imaged by the imaging system is larger than the imaging aperture area.

The frequency-scanning interferometer preferably includes a data acquisition system for acquiring the interferometric data at a plurality of different frequencies of the object and reference beams. The interferometric data contains information relating to differences between the object surface and the reference surface gathered as a result of reflections from both surfaces. The interferometric data for local areas within the overlapping images of the object and reference surfaces cycles through conditions of constructive and destructive interference with progressive variation in the beam frequencies. The processor converts the cyclical variations of the interferometric data as a function of frequency into the path length differences between the object and reference beams. The processor also preferably provides for converting the path length differences between the object and reference beams into measures of departures of the object surface from the nominal geometric surface form of the reference surface.

The reference beam has a nominal wavelength, and the non-specular or diffuse nature of the reference surface introduces path length variations into the reference beam. In fact, the path length variations introduced by the reference surface into the reference beam can be of an order that is near or even beyond a fringe spacing of the interference patterns. The interferometric data, however, preferably incorporates information about surface height variations of the object surface of an order that is well beyond the nominal wavelength of the reference beam. For comparing the object and reference surfaces to each other, the path length variations introduced by the reference surface into the reference beam are preferably of an order of magnitude smaller than the surface height variations of the object surface.

One or more beam filters can be incorporated into the frequency scanning interferometer for conditioning the object and reference beams. For example, a beam filter can be positioned between the illuminating and imaging systems for matching overall beam strength between the object and reference beams. The same or an additional filter can be used to more evenly distribute beam intensity throughout the beam aperture. Overall, the filters provide for scaling intensity and contrast of the interference patterns to the optimum ranges of the data acquisition system.

The invention can significantly reduce the cost and complexity of frequency-scanning interferometers by making a fundamental modification to the form of the reference surface used in the interferometer. A recognition of the attendant changes made possible by the modified reference surface is also required to fully exploit the invention. For example, the recognition should include an appreciation that a non-specular or diffuse reference surface is capable of making a representative portion of an otherwise expanding reference beam available to an imaging system at a reduced aperture dimension.

The recognition should also include an appreciation that the optical path lengths between the object and reference beams through the imaging system are not affected by the different angles of reflection through which the non-specular reference surface redirects portions of the reference beam. Moreover, the recognition should include an appreciation that the field-dependent incident angle variations associated with diverging object and reference beams can be accommodated by predetermined calibrations (i.e., scale factors) and are not subject to information losses otherwise accompanying fringe density variations of conventional interferometers. In other words, the disordered angular departures caused by diffusion can be accommodated by conjugate imaging, and the ordered angular departures caused by diverging illumination can be accommodated by applying field-dependent scale factors. Variations in fringe density accompanying the field-dependent variations in angles of incidence are not problematic to frequency-scanning interferometry; because unlike conventional interferometry, the resolution of path length variations is independent of nominal wavelength-related factors.

The invention is most applicable to a frequency-scanning interferometer of a type that produces a series of interference patterns between object and reference beams over the range of different frequencies. The object beam encounters an object surface, the reference beam encounters a reference surface, and the series of interference patterns are subject to differences between the object and reference surfaces. One expression of the proposed improvement includes forming the reference surface as a diffuse surface for altering the reference beam.

Preferably, the diffuse surface produces a largely random alteration of the reference beam. For example, the diffuse surface can be arranged for scattering the reference beam throughout a range of different directions and thereby reduce anisotropic reflection of the reference beam. However, the diffuse surface can include beam-shaping structures that produce an at least partially ordered alteration of the reference beam. For example, such beam-shaping structures can be used to alter a distribution of beam components within the reference beam.

The reference beam contains a plurality of rays, and the rays of the reference beam subject to random alteration propagate in an increased number of directions after encountering the reference surface. The reference beam propagates toward the reference surface along an optical axis; and whether the alteration is random or ordered, an increasing percentage of the rays of the reference beam preferably converge toward the optical axis after encountering the diffuse reference surface.

The diffuse reference surface introduces path length variations between the object and reference beams that can at least partially obscure the identification of interference fringes in the interference patterns. However, surface height variations of the object surface introduce path length variations between the object and reference beams of an order of magnitude or more larger than the path length variations introduced by the diffuse reference surface.

Overall, the diffuse reference surface has a nominal geometric form, and the series of interference patterns record differences between the object surface and the nominal geometric form of the diffuse reference surface. For example, the nominal geometric form of the diffuse reference surface can be a plane. For reducing the size of illuminating and imaging optics, the reference beam can be propagated toward the nominally planar reference surface as an expanding beam and a representative portion of the reference beam can be propagated away from the nominally planar reference surface as a converging beam.

The invention also spawns new methods of interferometrically measuring surface features of test objects. An object surface can be illuminated with an object beam, and a reference surface can be illuminated with a reference beam. The object beam is non-specularly reflected from the object surface and the reference beam is non-specularly reflected from the reference beam so that directional components of the object and reference beams are altered upon reflection. Overlapping images of the object and reference surfaces are produced for gathering interferometric data based on path length differences between the object and reference beams. A frequency of the object and reference beams at which interferometric data is gathered is regulated over a range of different frequencies. Variations in the interferometric data as a function of frequency are converted into measures of the path length differences between the object and reference beams.

Preferably, the non-specular reflection produces a largely random alteration of the reference beam. For example, the non-specular reflection can scatter the reference beam throughout a range of different directions and thereby reduce anisotropic reflection of the reference beam. Alternatively, the non-specular reflection can produce an at least partially ordered alteration of the reference beam.

The reference beam preferably expands along a path of propagation toward the reference surface and includes a representative portion that contracts along a path of propagation away from the reference surface. The illumination of both the object surface and the reference surface is preferably accomplished without collimating optics.

A series of interference patterns are produced from the overlapping images over the range of discrete frequencies, and the step of non-specularly reflecting includes introducing path length variations between the object and reference beams that at least partially obscure the identification of interference fringes in the interference patterns. However, the path length variations introduced by the reference surface are of an order of magnitude or more less than path length variations introduced by the object surface.

DETAILED DESCRIPTION

Figure 2:
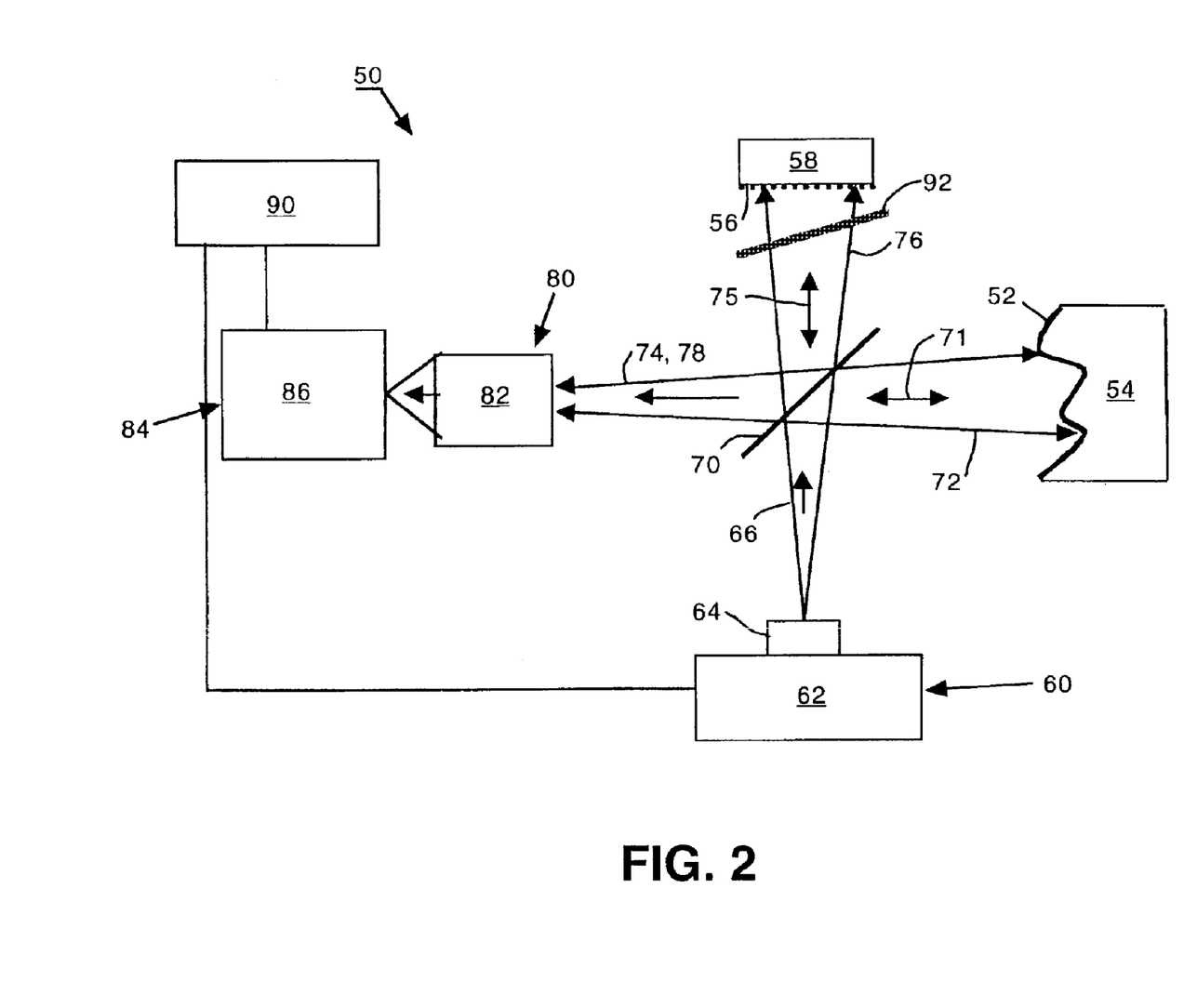
FIG. 2 is a block diagram showing an improved interferometer system according to the invention.

An embodiment of the invention as a modified frequency-scanning interferometer 50 arranged for measuring a diffuse object surface 52 is shown in FIG. 2. The frequency-scanning interferometer 50 is configured generally as a Twyman-Green interferometer, but other known interferometer configurations could also be used. However, unlike conventional Twyman-Green interferometers, no collimating optics are employed and a reference surface 56 is arranged as a non-specular or diffuse surface.

A radiation source 62 associated with an illuminating system 60 produces an expanding measuring beam 66. Beam conditioning optics 64 control expansion of the measuring beam 66 to fill corresponding aperture dimensions of the object surface 52 and the reference surface 56. Preferably, the radiation source 62 is a point source of coherent radiation, such as a diode laser (e.g., a GaAs-based laser), tunable through a limited range of frequencies (or wavelengths). The expanding measuring beam 66 preferably has a well-defined structure, such as a spherically diverging wavefront. A choice of nominal wavelength (e.g., 780 nm) can be made within the visible or invisible spectrum and can be selected on such bases as cost, resolution, and reflectance of the test object 54. A frequency-tunable laser preferred for the practice of this invention is disclosed in co-pending U.S. application Ser. No. 10/446,012, filed May 27, 2003, entitled TUNABLE LASER SYSTEM HAVING AN ADJUSTABLE EXTERNAL CAVITY, which is hereby incorporated by reference.

A beamsplitter 70 divides the expanding measuring beam 66 into an expanding object beam 72 and an expanding reference beam 76. The expanding object beam 72 propagates along an optical axis 71 to the object surface 52 of a test object 54, and the expanding reference beam 76 propagates along an optical axis 75 to the reference surface 56 of a reference element 58. The expanding object and reference beams 72 and 76 preferably encounter the object and reference surfaces 52 and 56 at angles of incidence that are well-defined with respect to their respective optical axes 71 and 75.

Both the object surface 52 and the reference surface 56 are non-specular or diffuse reflective surfaces. The object 54 can be a machined part with the object surface 52 having a surface roughness that tends to scatter incident radiation. The reference surface 56 of the reference element 58 is specifically fashioned as a non-specular or diffuse reflective surface. Preferably, the non-specular reflection from the reference surface scatters the reference beam 76 throughout a range of different directions. As a result of such scattering, which can be random or partially ordered, a representative portion 74 of the object beam 72 is reflected from the object surface 52 along the optical axis 71 on a converging return path to the beamsplitter 70, and a representative portion 78 of the reference beam 76 is reflected from the reference surface 56 along the optical axis 75 on a converging return path to the beamsplitter 70.

The representative portions 74 and 78 of the object and reference beams 72 and 76 preferably emanate from throughout the aperture dimensions of the object surface 52 and the reference surface 56. The beamsplitter 70 recombines and directs the representative portions 74 and 78 of the object and reference beams 72 and 76 to an imaging system 80 containing focusing optics 82, which produce overlapping images of the object surface 52 and reference surface 56. The focusing optics 82 can be smaller and less complicated than usual because the representative portions 74 and 78 of the object and reference beams 72 and 76 approach the focusing optics 82 within the bounds of converging beams. Propagating directions through the beamsplitter 70 can be governed by known polarization techniques.

The focusing optics 82 of the imaging system 80 have an imaging aperture area, and the object surface 52 imaged by the focusing optics has a transverse area that is considerably larger than the imaging aperture area. Similarly, beam conditioning optics 64 of the illuminating system 60 have an illuminating aperture area, and the transverse area of the object surface 52 is larger than the illuminating aperture area. A traverse area of the reference surface 56 that is imaged by the focusing optics 82 is also larger than both the imaging aperture area and the illuminating aperture area.

A data acquisition system 84 including a detector array 86, which can be located in the focal plane of the focusing optics 82, records details of interference patterns produced between the representative portions 74 and 78 of the object and reference beams 72 and 76. The detector array 86 is preferably conjugate to both the object surface 52 and the reference surface 56 so that illuminated points on the two surfaces 52 and 56 are reproduced as corresponding points of focus on the detector array 86. Thus, the light arriving at the points of focus can originate at a range of angles from the illuminated points on the two surfaces 52 and 56, while traversing the same optical path lengths between the conjugate points.

Preferably, the detector array 86 is composed of an array of individually addressable elements (such as charge-coupled devices) for separately measuring intensity at different points in the interference patterns (i.e., the overlapping images of the object and reference surfaces 52 and 56). A computer 90 stores and processes the interferometric data (e.g., intensity) acquired by the detector array 86. In addition, the computer 90 controls the radiation source 62 to incrementally shift the frequency of the measuring beam 66 for acquiring interferometric data from a series of interference patterns at the different frequencies.

The intensity values "I" recorded by elements of the detector array 86 can be written as the sum of two coherent components; one from the object beam 72 "$U_{obj}$" and one from the reference beam 76 "$U_{ref}$" as follows:

$$I = |(U_{obj} + U_{ref})|^2. \quad (1)$$

The recorded intensity "I" corresponds, for example, to the intensity measured by a pixel within the image produced by the object and reference beams 72 and 76. The object beam 72 "$U_{obj}$" can be written as:

$$U_{obj} = A_1 e^{i\left(\frac{2\pi}{\lambda} R_1\right)}, \quad (2)$$

and the reference beam 76 "$U_{ref}$" as:

$$U_{ref} = A_2 e^{i\left(\frac{2\pi}{\lambda} R_2\right)}, \quad (3)$$

where "$A_1$" and "$A_2$" are the amplitudes, "$\lambda$" is the wavelength, and "$R_1$" and "$R_2$" are the optical paths for the two beams 72 and 76.

Considering the path length difference as "$R = R_1 - R_2$", the intensity "I" of an individual data point can be written as:

$$I = |A_1|^2 + |A_2|^2 + 2A_1 A_2 \cos\left(\frac{2\pi}{\lambda} R\right), \quad (4)$$

or using frequency notation:

$$I = |A_1|^2 + |A_2|^2 + 2A_1 A_2 \cos\left(\frac{2\pi}{c} R\nu\right), \quad (5)$$

where "c" is the speed of light and "$\nu$" is the beam frequency.

The intensity "I" described by the cosine term of Equation (5) depends upon both the path length difference "R" and the beam frequency "$\nu$". For example, the cosine term of the intensity "I" represents the cycling of the object and reference beams 72 and 76 through conditions of constructive and destructive interference as a function of the beam frequency "$\nu$". The periodicity of the intensity variation (preferentially referred to as the interference frequency) changes proportional to the path length difference "R". A determination of the interference frequency from the intensity data "I" gathered at a succession of "N" different beam frequencies "$\nu$" allows for the determination of the path length difference "R".

Equation (5) also shows that the intensity "I" has two basic terms: a bias term equal to "$|A_1|^2 + |A_2|^2$" and a cosine term. The sinusoidal intensity variation of interest arises from the cosine term. The bias term is an offset that can be easily removed by computing the mean "$\bar{I}$" of the intensity data and subtracting this mean from Equation (5). The mean "$\bar{I}$" of the intensity data can be computed as follows:

$$\bar{I} = \frac{1}{N} \sum_{n=1}^{N} I(n). \quad (6)$$

where "I(n)" denotes the intensity of corresponding data points of individual interference patterns totaling "N" different interference patterns. Each "n" represents the data collected in an interference pattern at a different beam frequency "$\nu$"

The detected intensity "I'(n)" of each data point within an interference pattern "n" with the bias term removed is as follows:

$$I'(n) = |A_1|^2 + |A_2|^2 + 2A_1 A_2 \cos\left(\frac{2\pi}{c} R\nu\right) - \bar{I}, \quad (7A)$$

or $$I'(n) = 2A_1 A_2 \cos\left(\frac{2\pi}{c} R\nu\right) \quad (7B)$$

As is apparent from Equation (7B), the frequency of the cosine term depends upon the frequency (or wavelength) of the measuring beam 66 and "R"—the optical path difference (OPD). Based on the incremental changes in beam frequency "$\nu$" provided by the tunable laser 62, a value of "R" can be fit to the function using Fourier transform methods. The procedure involves recording the interference patterns for a series of "N" beam frequencies. The data from each detector element is then Fourier transformed using known (or estimated) beam frequencies, and the locations of the peak interference frequencies of variation reveal the values of "R" for each detector element.

A discrete Fourier transform for assessing the frequency components of the function "I'(n)" can be written as follows:

$$K'(m) = \sum_{n=1}^{N} I'(n)\exp[-i2\pi(n-1)(m-1)/M] \quad (8)$$

where "M" is the total number of frequency component samples distributed evenly throughout Fourier frequency space, "m" denotes one of the ordered frequency components ordered from 1 to "M" throughout the Fourier frequency space, and "K'(m)" measures how well each of the "m" ordered individual frequency component samples (also referred to as bins) matches the interference frequency of the recorded data point intensities "I'(n)" at corresponding areas of the "n" ordered interference patterns. Techniques for expeditiously solving the Fourier transform are given in co-pending U.S. application Ser. No. 10/601,802, filed Jun. 23, 2003, now U.S. Pat.No. 6,741, 361, entitled MULTI-STAGE DATA PROCESSING FOR FREQUENCY-SCANNING INTERFEROMETER based on U.S. Provisional Application No. 60/391,004, filed Jun. 24, 2002, which are both hereby incorporated by reference.

In practice, it is desirable to have the intensity of the representative reference and object beam portions 74 and 78 be similar in strength. A neutral density filter 92 located along the optical axis 75 of the reference beam 76 can be used for this purpose. However, to prevent undesirable back reflections, the neutral density filter 92 is preferably tilted with respect to the reference surface 56. An operator can tune the variable neutral density filter 92, or the control computer 90 can be programmed to adjust the optical density of the filter 92 to optimize the imaging conditions for each frequency of the measuring beam. Such tuning can be accomplished, for example, by using several different filters of differing density values in a wheel arrangement that can be rotated to place the correct filter in the field of view.

One or more apodizing filters (not shown) can be located along the paths of the object beam 72 and the reference beam 76 to better balance intensities throughout the beam apertures. Since reflections from both the object surface 52 and the reference surface 56 are expected to be stronger toward aperture centers where the paraxial reflections are approached, Gaussian apodizing filters are preferred. Together, the filters are intended to match intensity range data appearing in the interference patterns to the optimum performance range of the data array 86.

With both a diffuse object surface 52 and a diffuse reference surface 56 imaged onto the detector array 86, the recorded interference patterns are expected to appear as random speckle patterns. The diffuse reference surface 56 is expected to introduce path length variations between the object and reference beams that at least partially obscure the identification of interference fringes in the interference patterns. The surface height variations of the diffuse object surface 52 introduce path length variations between the object and reference beams 72 and 76 of an order of magnitude or larger than the path length variations introduced by the diffuse reference surface 56. Accordingly, the interference patterns are expected to record surface height variations well beyond the unambiguous range of conventional interferometers.

The value of a range ambiguity interval "$\Delta R_{AMB}$" for the frequency scanning interferometer 50 is given as:

$$\Delta R_{AMB} = c/2\Delta v_{INC} \quad (9)$$

where "$\Delta v_{INC}$" is the size of the beam frequency increment between intensity data point samples.

The value of a range resolution "$\Delta R_{RES}$" corresponding to a single complete cycle of constructive and destructive interference within the entire range (or bandwidth) "$\Delta v_{TOTAL}$" of beam frequencies is given as:

$$\Delta R_{RES} = c/2\Delta v_{TOTAL} \quad (10)$$

Preferably, a scattering depth (i.e., surface height variation) of the non-specular reference surface 56 is limited to a scattering depth not larger than the uncertainty of the measurement, thereby reducing blur of the optical path difference (OPD) measurement of the frequency-scanning interferometer 10. Within the range resolution "$\Delta R_{RES}$", significantly less measurement uncertainty can be achieved by more precisely locating the peak intensity frequency.

Due to irregularities of diffusion, the speckle intensity can be low at specific points in the interference patterns. Such low points can cause signal dropouts, where the variations in interferometric data are obscured by system noise. The incidence of error can be minimized by arranging the detector array 86 to have a sufficient signal-to-noise ratio for the purpose. In addition, such dropouts can be easily eliminated by post processing using, for example, a median filter.

The non-specular reference surface 56 can be formed, for example, as a diffuse reflective surface or as an optically diffuse layer (e.g., cellophane tape) applied to a surface of a mirror. The non-specular reference surface 56 can also be formed by many other techniques including depositing microscopic particles onto a surface or sand blasting or otherwise abrading a metal or other reflective surface. Generally, it is preferred that the non-specular reference surface 56 angularly distributes incident radiation in a random manner throughout its effective aperture. However, at least partially ordered distributions of the incident radiation can be used for such purposes as more evenly filling the aperture of the imaging system 80. Further technical advantages in interferometry arising from the use of a non-specular or diffuse reference surface 56 will become more apparent from FIGS. 3–6.

Figure 3:
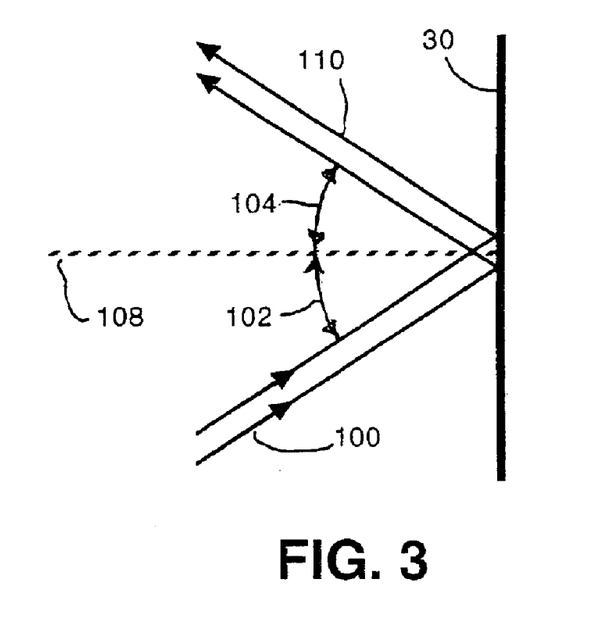
FIG. 3 is a side view diagram showing specular reflections from a conventional reference surface.

FIG. 3 shows a portion of the conventional specular reference surface 30, as used in the interferometer 10 of FIG. 1. Incident rays 100 reflect from the reference surface 30 obeying the law of reflection whereby the angle of reflection 104 is equal to the angle of incidence 106 referenced to the surface normal 108. The reflected rays 110 form an unaltered portion of the reference beam 26 that must in turn be collected by the focusing optics 34. Since the reference beam 26 is collimated and the reference beam is not altered by its reflection, the focusing optics must be sized comparable to the reference surface 30 to image the reference surface 30 onto the detector array 36.

Figure 4:
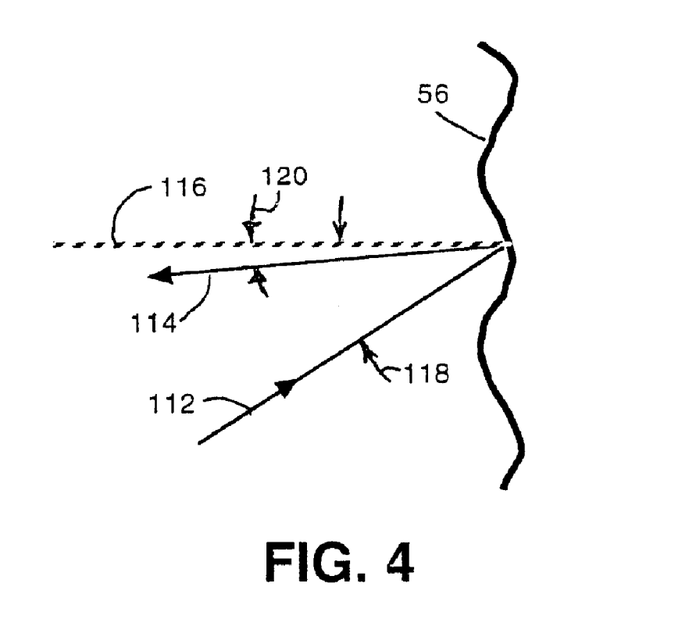
FIG. 4 is a similar side view diagram showing non-specular reflection from a diffuse reference surface according to the invention.

FIG. 4 shows an enlarged portion of the non-specular reference surface 56 as used in the interferometer 50 of FIG. 2. Although only one pair of incident and reflecting rays 112 and 114 are shown, it is apparent that the incident rays 112 can be diffusely reflected in many directions referenced to a normal 116 to the nominally planar form of the non-specular reference surface 56. The angle of reflection is determined by the local surface normal, which varies considerably with respect to the surface form normal 116. However, measured with respect to the surface form normal 116, the angle of incidence 118 is unchanged, but the angles of reflection 120 can vary widely. The scattering strength of the non-specular reference surface 56 determines the breadth of the angular divergence of the reflected rays. Since the angular divergence of the reference beam 76 redirects some of the rays originally propagating on diverging paths into corresponding rays propagating on converging paths, the focusing optics 82 can be dimensioned much smaller while still collecting the representative portion 78 of the reference beam 76.

Figure 5:
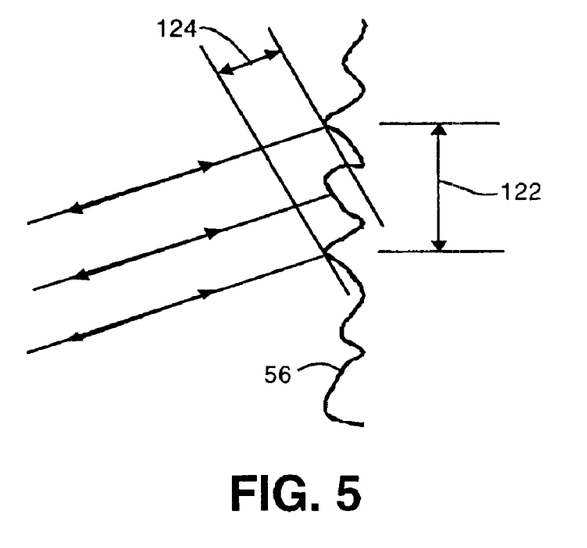
FIG. 5 is another diagramatic view of the diffuse reference surface referencing scattering depth.

FIG. 5 illustrates some additional features of light scattered by the non-specular reference surface 56. The features include dimensions 122 of a virtual detector pixel, which is the image of a detector pixel projected onto the non-specular reference surface 56. An actual detector pixel thus collects light nominally from this dimensioned region. A scattering depth 124 is also shown, which is the range of depth values that contribute to the reflected reference beam. Because the reference surface 56 is diffuse, the number of scattered contributions and their relative phases are random variables. It follows that when there are several randomly phased contributions, as is the case here, the reference beam 76 is speckled. The statistical properties of the speckle are dictated by the geometry of the non-specular reference surface 56 and also by properties of the imaging system impulse response (IPR) function and the detector pixel size 122 [see, for example, J. C. Dainty, editor, Laser Speckle and Related Phenomena, Springer-Verlag, Berlin, 1984, which is hereby incorporated by reference].

There are two important effects. First, the amplitude of the reference beam 76 at each pixel is a random variable. Note, however, that the image formation process described herein works independently of the reference beam strength, and thus the random nature of the reference amplitude is not problematic. If, however, the amplitude is extremely small, so that the cosine modulation is below the noise level of the system, an erroneous range measurement could result. This effect is called a speckle dropout. The occurrence of speckle dropouts can be minimized by using detector pixels that are somewhat larger than the imaging system IPR. In general, the probability density function of the reference intensity becomes Gaussian and the detector pixel size 122 and IPR are chosen to minimize the probability of low reference strength. Furthermore, speckle dropouts are, in practice, isolated pixels that can be easily identified and removed by median filtering [see, for example, A. Rosenfeld and A. C. Kak, Digital Picture Processing, Vol. 1, Academic Press, New York, 1982, which is hereby incorporated by reference].

A second effect of the non-specular reference surface 56 is that the depth values within a pixel region are distributed as shown in the FIG. 5. For a given measurement, it is desirable to have this scattering depth to be unresolved by the depth measurement. For example, the beam frequencies and processing parameters could be set so that the depth measurements of the object surface 52 are made with a given resolution (e.g., 10 microns). The non-specular reference surface 56 could than be designed so that the scattering depth is much less than the given resolution (e.g., 10 microns). The resolved depth fluctuations encoded by the interference patterns would then be attributable to the object surface 52 under test.

Figure 6:
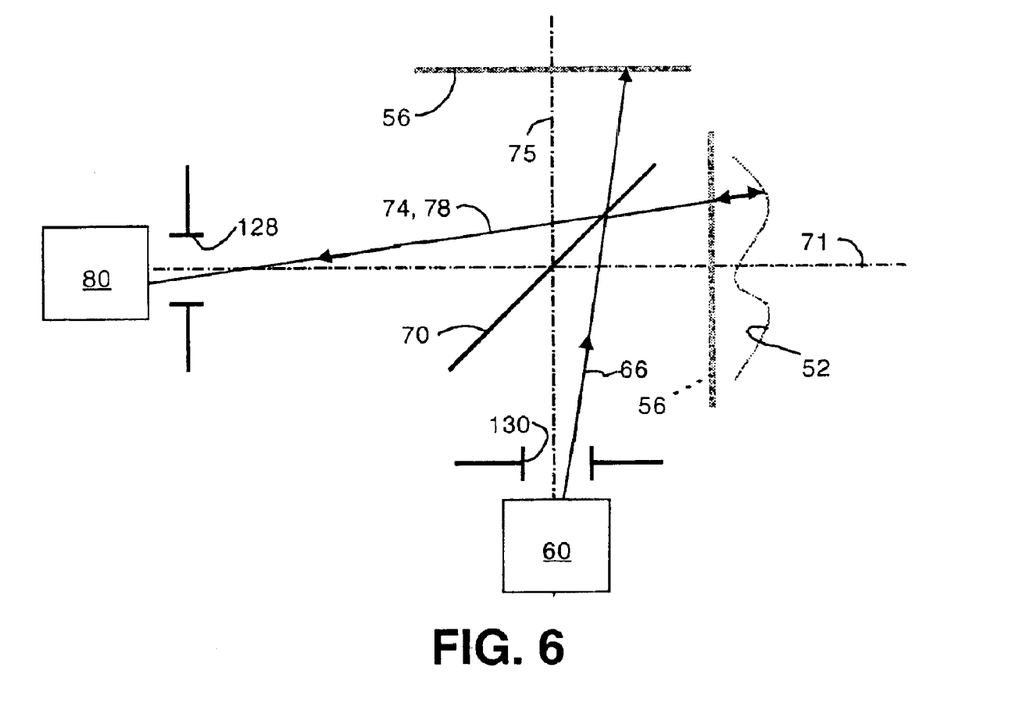
FIG. 6 is another block diagram depicting advantages and effects of the smaller and less complex illuminating and imaging systems made possible in accordance with the invention.

Advantages of using a non-collimated illumination beam are apparent from FIG. 6. The object and reference surfaces 52 and 56 are illuminated with non-collimated measuring beam 66 from the tunable laser radiation source 62. Because the object surface 52 of the test object 54 and the reference surface 56 of the reference element 58 are both diffuse, some of the rays (i.e., representative portions 74, 78 of the object and reference beams 72 and 76) reflect from these surfaces along converging paths through the beamsplitter 70 and can be collected by the imaging system 80 through an effective aperture 128 that is smaller than the dimensions of the object and reference surfaces 52 and 56 that are imaged. In addition to obviating requirements for a collimating system, an effective aperture 130 of the illuminating system 60 is also much smaller than the imaged dimensions of the object and reference surfaces 52 and 56.

Due to the expanding form of the measuring beam 66, the measured optical path difference (OPD) is not exactly parallel to the optical axes 71 and 75. That is, the object and reference surfaces 52 and 56 are illuminated at field-dependent angles of incidence. Accordingly, height variations of the object surface 52 are related to the optical path difference (OPD) by a cosine of the angular departures (i.e., the field-dependent departures from normal incidence). Since the angular departures of the measuring beam 66 are known (e.g., as the contents of a spherically diverging wavefront), field-dependent scale factors can be used in processing the interferometric data from the detector array 86 to extract the component of the OPD that is parallel to the optical axes 71 and 75. A curved reference surface can also be used to make a similar correction.

Variations and modifications in the described interferometer system using a non-specular reference surface will undoubtedly suggest themselves to those skilled in the art. For example, the invention is generally applicable to a range of interferometer types adaptable to the use of non-specular reference surfaces including other single-pass or double-pass interferometers nominally operated at normal or grazing incidence. As an alternative to laser tuning, frequency filters could be used in advance of the detector array to collect interferometric data at different frequencies. Accordingly, the foregoing description should be taken as illustrative and not in a limiting sense.

We claim:

1. An interferometer for comparing an object surface to a reference surface for measuring departures of the object surface from a nominal geometric surface form of the reference surface comprising:

an illuminating system that illuminates the object surface with an object beam and the reference surface with a reference beam along separate optical pathways such that the object beam does not pass through the reference surface on route to the object surface;

an imaging system that produces overlapping images of the object surface and the reference surface with the object and reference beams containing interferometric data based on path length differences between the object and reference beams reflected from a plurality of corresponding points on the object and reference surfaces;

a frequency regulator that varies a frequency of the object and reference beams at which the interferometric data is produced over a range of different beam frequencies;

a data acquisition system that gathers the interferometric data from the plurality of corresponding points within the overlapping images of the object and reference surfaces as the interferometric data varies through conditions of constructive and destructive interference as a result of the variation in the beam frequency;

a processor that converts the variations in the interterometric data as a function of the variation in beam frequency into measures of the path length differences between the object and reference beams from the plurality corresponding points on the object and reference surfaces and converts the path length differences between the object and reference beams from the plurality of corresponding points on the object and reference surfaces into measures of departures of the object surface from the nominal geometric surface form of the reference surface; and the reference surface being a substantially diffuse surface that scatters rays of the reflected reference beam through a plurality of different angles that contribute to the imaging of the reference surface by the imaging system.

2. The interferometer of claim 1 in which the reference surface has a nominal geometric surface form, and measured with respect to normals to the reference surface's nominal geometric surface form, rays of the reference beam reflect from the reference surface at angles that depart from angles at which the reference beam rays are incident upon the reference surface.

3. The interferometer of claim 2 in which the interferometric data contains information relating to differences between the object surface and the reference surface gathered as a result of reflections from both surfaces, and further comprising a data acquisition system that acquires the interferometric data at a plurality of different frequencies of the object and reference beams.

4. The interferometer of claim 3 in which the interferometric data for local areas within the overlapping images of the object and reference surfaces cycles through conditions of constructive and destructive interference with progressive variation in the beam frequencies, and the processor converts cyclical variations in the interferometric data as a function of frequency into path length differences between the object and reference beams and converts the path length differences between the object and reference beams into measures of departures of the object surface from the nominal geometric surface form of the reference surface.

5. The interferometer of claim 2 in which the reference surface is a nominally planar surface, and the interferometric data contains information relating to differences between the object surface and the nominally planar form of the reference surface.

6. The interferometer of claim 5 in which the reference beam propagates toward the reference surface along an optical axis, and more of the rays the reference beam converge toward the optical axis immediately after reflection from the reference surface than immediately before reflection from the reference surface.

7. An interferometer for comparing an object surface to a reference surface comprising:

an illuminating system that illuminates the object surface with an object beam and the reference surface with a reference beam;

an imaging system that produces overlapping images of the object surface and the reference surface with the object and reference beams for gathering interferometric data based on path length differences between the object and reference beams;

a frequency regulator that regulates a frequency of the object and reference beams at which the interferometric data is gathered over a range of different beam frequencies;

a processor that converts variations in the interferometric data as a function of beam frequency into measures of the path length differences between the object and reference beams;

the reference surface being substantially non-specular so that the reference beam is altered upon reflection to enhance the imaging of the reference surface;

the reference surface having a nominal geometric surface form, and measured with respect to normals to the reference surface's nominal geometric surface form, rays of the reference beam reflect from the reference surface at angles that depart from angles at which the reference beam rays are incident upon the reference surface; and the non-specular reference surface reducing anisotropic reflection of the reference beam.

8. The interferometer of claim 2 in which the non-specular reference surface includes beam-shaping structures that produce an at least partially ordered alteration of the reference beam.

9. The interferometer of claim 1 in which the illuminating system produces a non-collimated reference beam that expands upon approach to the reference surface.

10. The interferometer of claim 9 in which representative portion of the reference beam reflects from the reference surface on a converging path toward the imaging system.

11. The interferometer of claim 1 in which the illuminating system produces non-collimated object and reference beams that expand upon approach to the object and reference surfaces, and representative portions of both the object beam and the reference beam reflect from the object and reference surfaces on converging paths toward the imaging system.

12. The interferometer of claim 11 in which the imaging system has a imaging aperture area, and the object surface imaged by the imaging system has a transverse area that is larger than the imaging aperture area.

13. The interferometer of claim 12 in which the illuminating system has an illuminating aperture area, and the transverse area of the object surface is larger than the illuminating aperture area.

14. The interferometer of claim 13 in which a traverse area of the reference surface that is imaged by the imaging system is larger in area than both the imaging aperture area and the Illuminating aperture area.

15. The interferometer of claim 1 in which the overlapping images of the object surface and the reference surface produce a series of interference patterns over the range of different frequencies, and the path length variations introduced by the reference surface into the reference beam at least partially obscure the identification of interference fringes in the interference patterns.

16. The interferometer of claim 15 in which the path length variations introduced by the reference surface into the reference beam are of an order of magnitude or more smaller than the path length variations introduced by surface height variations of the object surface.

17. The interferometer of claim 1 further comprising a beam filter positioned between the illuminating and imaging systems for relatively adjusting beam strength between the object and reference beams.

18. The interferometer of claim 17 in which the beam filter provides for more evenly distributing beam intensity throughout a beam aperture.

19. In frequency-scanning interferometer of a type that produces a series of interference patterns between object and reference beams over the range of different frequencies, the object beam being arranged for encountering an object surface, the reference beam being arranged for encountering a reference surface, the object beam encountering the object surface without encountering the reference surface, the series of interference patterns being subject to differences between the object and reference surfaces, interferometric data being gathered from a plurality of points in the interference patterns corresponding to overlapping points on the object and reference surfaces, and the interferometric data from each of the points in the interference patterns cycling through conditions of constructive and destructive interference as a result of progressive variations in the beam frequency, wherein the improvement comprises:

the reference surface being a diffuse surface that scatters rays of the reference beam in a substantially random manner for contributing to the formation of individual points in the interference patterns from a plurality of different directions.

20. In frequency-scanning interferometer of a type that produces a series of interference patterns between object and reference beams over the range of different frequencies, the object beam being arranged for encountering an object surface, the reference beam being arranged for encountering a reference surface, and the series of interference patterns being subject to differences between the object and reference surfaces, wherein the improvement comprises:

the reference surface being a diffuse surface for altering the reference beam, the diffuse surface producing a largely random alteration of the reference beam, and the diffuse surface being a non-specular reflective surface that reduces anisotropic reflection of the reference beam.

21. The improvement of claim 19 in which the reference beam contains a plurality of rays, and the rays of the reference beam propagate in an increased number of directions after encountering the reference surface.

22. The improvement of claim 19 in which the reference beam contains a plurality of rays and propagates toward the reference surface along an optical axis, and an increasing percentage of the rays of the reference beam converge toward the optical axis after encountering the diffuse reference surface.

23. The improvement of claim 19 in which the diffuse reference surface introduces path length variations between the object and reference beams that at least partially obscure the identification of interference fringes in the interference patterns.

24. In frequency-scanning interferometer of a type that produces a series of interference patterns between object and reference beams over the range of different frequencies, the object beam being arranged for encountering an object surface, the reference beam being arranged for encountering a reference surface, and the series of interference patterns being subject to differences between the object and reference surfaces, wherein the improvement comprises:

the reference surface being a diffuse surface for altering the reference beam, the diffuse reference surface introducing path length variations between the object and reference beams that at least partially obscure the identification of interference fringes in the interference patterns, and surface height variations of the object surface introducing path length variations between the object and reference beams of an order of magnitude larger than the path length variations introduced by the diffuse reference surface.

25. The improvement of claim 19 in which the diffuse reference surface has a nominal geometric form, and the series of interference patterns record differences between the object surface and the nominal geometric form of the diffuse reference surface.

26. The improvement of claim 25 in which the nominal geometric form of the diffuse reference surface is a plane.

27. The improvement of claim 26 in which the reference beam propagates toward the nominally planar reference surface as an expanding beam and a representative portion of the reference beam propagates away from the nominally planar reference surface as a converging beam.

28. The improvement of claim 19 in which the diffuse reference surface is a non-specular reflective surface.

29. The improvement of claim 28 in which the reference surface has a nominal geometric surface form, and measured with respect to normals to the reference surfaces' nominal geometric surface form, rays of the reference beam reflect from the reference surface at angles that depart from angles at which the reference beam rays are incident upon the reference surface.

30. The improvement of claim 29 in which the reference beam propagates toward the reference surface along an optical axis, and more of the rays the reference beam converge toward the optical axis immediately after reflection from the reference surface than immediately before reflection from the reference surface.

31. The improvement of claim 30 in which the reference surface has a nominally planar form.

32. The improvement of claim 19 further comprising a beam filter for more evenly distributing beam intensity throughout a beam aperture.

33. A method of interferometrically measuring surface features of an object surface of a test object as measures of departures of the object surface from a nominal geometric surface form of a reference surface comprising steps of:

illuminating the object surface with an object beam and the reference surface with a reference beam along separate optical pathways such that the object beam does not pass through the reference surface on route to the object surface;

non-specularly reflecting the reference beam from the reference surface so that directional components of the reference beam are altered upon reflection through a plurality of different angles;

producing overlapping images of the object surface and the reference surface with the object and reference beams for gathering interferometric data based on path length differences between the object and reference beams reflected from a plurality of corresponding points on the object and reference surfaces;

the reference surface being a diffuse surface that is imaged through the plurality of different angles at which the reference beam is reflected from the reference surface;

varying a frequency of the object and reference beams at which interferometric data is gathered over a range of different frequencies;

converting variations in the interferometric data as a function of the variation in frequency into measures of the path length differences between the object and reference beams from the plurality corresponding points on the object and reference surfaces; and converting the path length differences between the object and reference beams from the plurality of corresponding points on the object and reference surfaces into measures of departures of the object surface from the nominal geometric surface form of the reference surface.

34. The method of claim 33 in which the step of illuminating includes expanding the reference beam along a path of propagation toward the reference surface, and the step of non-specularly reflecting includes contracting a portion of the reference beam along a path of propagation away from the reference surface.

35. The method of claim 33 in which the step of non-specularly reflecting includes producing a largely random alteration of the reference beam.

36. The method of claim 35 in which the step of non-specularly reflecting provides for scattering the reference beam throughout a range of different directions.

37. A method of interferometrically measuring surface features of test objects comprising steps of:

illuminating an object surface with an object beam and a reference surface with a reference beam;

non-specularly reflecting the reference beam from the reference surface so that directional components of the reference beam are altered upon reflection;

producing overlapping images of the object surface and the reference surface with the object and reference beams for gathering interferometric data based on path length differences between the object and reference beams;

regulating a frequency of the object and reference beams at which interferometric data is gathered over a range of different frequencies;

converting variations in the interferometric data as a function of frequency into measures of the path length differences between the object and reference beams;

the step of non-specularly reflecting including producing a largely random alteration of the reference beam; and the step of non-specularly reflecting reducing anisotropic reflection of the reference beam.

38. The method of claim 33 in which the step of non-specularly reflecting includes producing an at least partially ordered alteration of the reference beam.

39. The method of claim 33 in which the step of illuminating includes producing non-collimated object and reference beams that expand upon approach to the object and reference surfaces, and at least portions of both the object beam and the reference beam non-specularly reflect from the object an reference surfaces on converting paths.

40. The method of claim 33 in which the step of producing overlapping images includes producing a series of interference patterns over the range of discrete frequencies, and the step of non-specularly reflecting includes introducing path length variations between the object and reference beams that at least partially obscure the identification of interference fringes in the interference patterns.

41. The method of claim 40 in which the path length variations introduced by the reference surface are of an order of magnitude or more less than path length variation introduced by the object surface.

42. The method of claim 33 including an additional step of non-specularly reflecting the object beam from the object surface so that directional components of the object beam are altered upon reflection.

43. The method of claim 33 in which the step of illuminating includes illuminating the object and reference surfaces at field-dependent angles of incidence.

44. The method of claim 43 including a further step of applying a field-dependent scale factor in the processing of the interferometric data to compensate for illuminating the object and reference surfaces at field-dependent angles of incidence.

* * * * *